(12) United States Patent
Novillo et al.

(10) Patent No.: US 8,464,234 B2
(45) Date of Patent: Jun. 11, 2013

(54) PRE-PARSED HEADERS FOR COMPILATION

(75) Inventors: Diego Alejandro Novillo, Mississauga (CA); Lawrence Alan Crowl, Mountain View, CA (US)

(73) Assignee: Google Inc., Mountain View, CA (US)

(*) Notice: Subject to any disclaimer, the term of this patent is extended or adjusted under 35 U.S.C. 154(b) by 126 days.

(21) Appl. No.: 13/280,122

(22) Filed: Oct. 24, 2011

(65) Prior Publication Data

US 2013/0104112 A1    Apr. 25, 2013

(51) Int. Cl.
*G06F 9/45* (2006.01)

(52) U.S. Cl.
USPC .......................... 717/151; 717/140

(58) Field of Classification Search
USPC ................................. 717/140, 151
See application file for complete search history.

(56) References Cited

U.S. PATENT DOCUMENTS

| | | | |
|---|---|---|---|
| 5,182,806 A | 1/1993 | McKeeman et al. | |
| 5,204,960 A | 4/1993 | Smith et al. | |
| 5,692,196 A | 11/1997 | Unni et al. | |
| 5,812,853 A * | 9/1998 | Carroll et al. | 717/143 |
| 6,182,281 B1 * | 1/2001 | Nackman et al. | 717/116 |
| 2008/0141288 A1 * | 6/2008 | Ishikawa et al. | 720/601 |
| 2008/0263528 A1 * | 10/2008 | Moore et al. | 717/139 |

OTHER PUBLICATIONS

"3.20 Using Precompiled Headers, Precompiled Headers—Using the GNU Compiler Collection (GCC)," downloaded on Oct. 24, 2011 from http://gcc.gnu.org/onlinedocs/gcc/Precompiled-Headers.html, 2 pages.

* cited by examiner

*Primary Examiner* — Li B Zhen
*Assistant Examiner* — Hui-Wen Lin
(74) *Attorney, Agent, or Firm* — Honigman Miller Schwartz and Cohn LLP

(57) ABSTRACT

Disclosed herein are methods and systems for creating and using pre-parsed headers. One or more header files may be scanned into tokens. These tokens may then be parsed into abstract syntax trees. The abstract syntax trees may then be serialized in a modular form into pre-parsed headers on a storage device. Based upon directives in one or more source files, the pre-parsed headers may then be deserialized into abstract syntax trees and loaded from the storage device. The loaded abstract syntax trees may then be used in the compilation of the source files.

38 Claims, 8 Drawing Sheets

PRE-PARSED HEADERS FOR COMPILATION

BACKGROUND

1. Field

Embodiments relate to the field of compilers.

2. Background

Human readable code or instructions are often turned into executable software through the use of a program called a compiler. The compiler takes the code and translates it into a machine-readable form that can be understood by a computing device. The code itself may be split into several components. In some programming languages, the code may be split into one or more definitional components, referred to as source files, and one or more declarational components, referred to as header files. Source files may reference header files to use their declarations. In particular, multiple source files may reference the same header file for its declarations. For each reference to a header file a compiler encounters, the compiler generally processes the header file in its entirety, even though it may have previously processed it. Depending on the number and length of the header files, a significant portion of compilation time may be attributed to reprocessing of header files.

BRIEF SUMMARY

Embodiments include methods, systems, and computer readable storage media for creating and using pre-parsed headers. In an embodiment, one or more header files are scanned on a computing device into a tokenized form. The tokenized form is parsed on the computing device into one or more abstract syntax trees. One or more pre-parsed headers are created for the one or more header files, by serializing in a modular form, the one or more abstract syntax trees to a storage device.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A piece of software may consist of thousands of source files or more. Often, more than one source file may require access to the declarations in a particular header file. For example, a header file may provide a declaration for a function that contains operations which are commonly used throughout a software package. However, a header file can provide other declarations, such as constants, pre-processor instructions, and a variety of other declarations. A function declaration often specifies the inputs the function can receive and the outputs it returns. A function or method may be a grouping of instructions which takes one or more inputs, performs some number of operations on the inputs, and then returns one or more outputs based upon the results of the operations on the inputs. The act of executing a function may be referred to as "calling the function." In order to call a function, each source file may provide a reference to the header file which provides the function's declaration. This may allow the compiler to verify that the function is being used correctly. However, many source files may call the same function. This may cause a compiler to read and process the header file, regardless of whether it has already read and processed that same header file. This potentially results in duplication of work.

Compilers may use multiple parts or stages to process the source and header files of software. These parts perform different operations on the source and header files. They may transform the text contained in the source and header files into a variety of data structures which can help with the processing that occurs during compilation.

Figure 1:
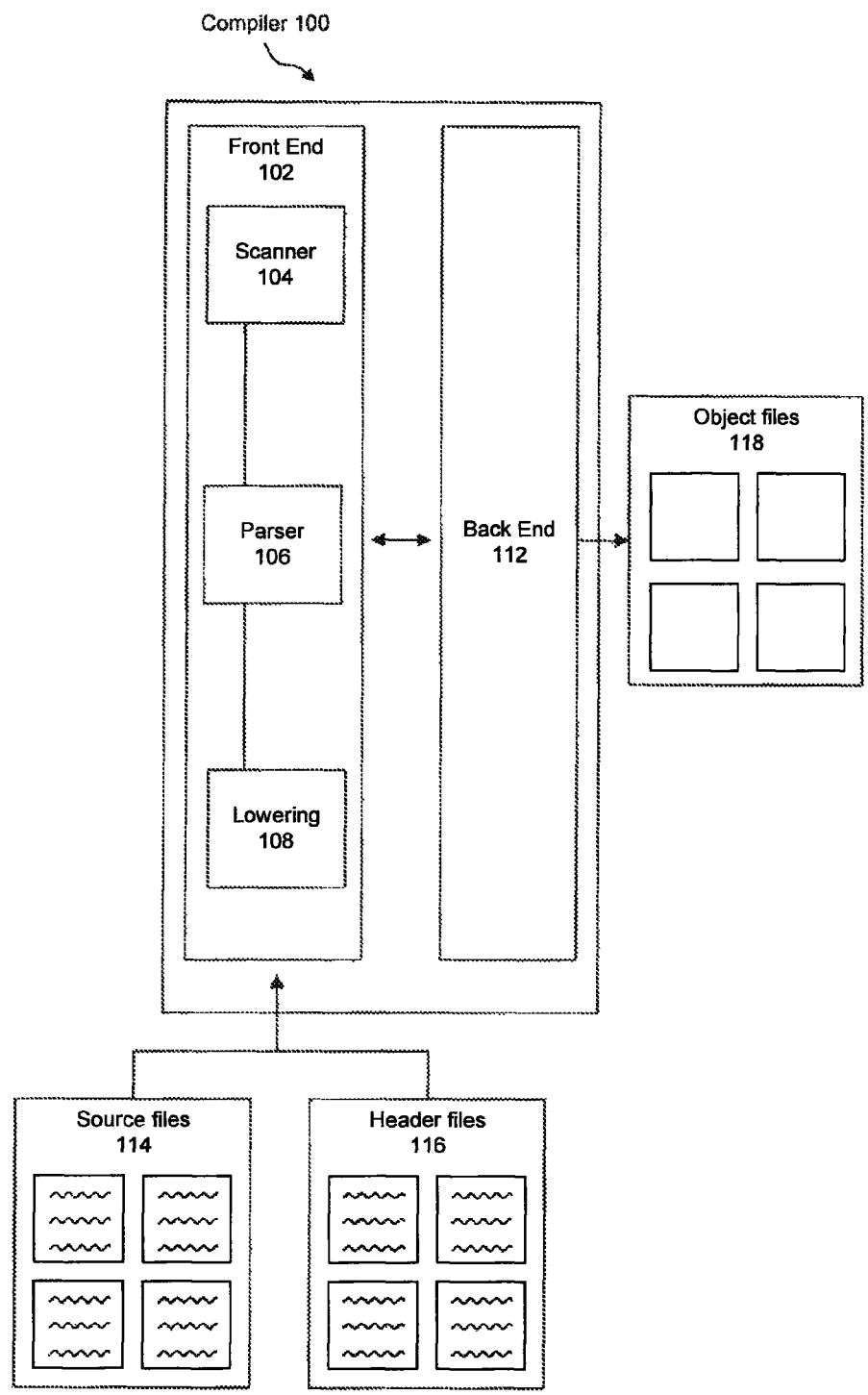
FIG. 1 is a diagram of a system of compilation according to an embodiment.

FIG. 1 is a diagram of a system of compilation. Compiler 100 includes a front-end component 102 and a back-end component 112. Front-end component 102 may be responsible for the initial processing of the text contained in source files 114 and header files 116.

Front-end component 102 further includes a scanner 104, a parser 106, and a lowering component 108. Source files 114 and header files 116 may be stored as text files on a storage device, such as a hard disk. The term source files, as used herein, refers to one or more source files. Similarly, the term header files, as used herein, refers to one or more header files.

In order to first process the text contained in source files 114 or header files 116, compiler 100 may first read the source files 114 and header files 116 from the storage device and then convert the text to a data structure that can be understood by the compiler 100. Text may be read in by a compiler in a tokenized form. A token is a data structure which may represent a word of text. Front-end component 102 also includes scanner 104 which is responsible for converting the text contained in source files 114 and header files 116 into a tokenized form. For example, for each word of text that may exist in source files 114 or header files 116, scanner 104 may convert those words into individual tokens. The tokens may be strung together to form a sentence of programming code syntax.

Scanner 104 may be further configured to substitute tokens for their definitions in a preprocessor symbol table. The preprocessor symbol table may be a table that contains preprocessor symbols and their corresponding definitions. The preprocessor symbols may be defined in a header file or by the compiler itself. The preprocessor symbols may also be macros, or a variety of other types of symbols depending on the particular compiler or programming. A macro may be a symbol which defines text that may be substituted any time a macro symbol is encountered in a header file or a source file. For example, a macro symbol named "example" may be defined to correspond to the text "example text." Any time a compiler encounters the symbol "example," the compiler may substitute the symbol for the text of "example text." The symbols and their definitions may then be placed in a table called the preprocessor symbol table. This may then allow the preprocessor symbol table to maintain a table of all of the effective preprocessor symbol and their corresponding definitions. When scanner 104 encounters a symbol that is in the preprocessor symbol table, it may replace that symbol with the corresponding definition in the table. Using the above example, each time scanner 104 encounters a token of "example," scanner 104 may replace the "example" token with a new token of "example text."

However, the process scanner 104 may execute in order to convert source files and header files into tokens and create preprocessor symbol tables takes a period of time. Sometimes scanning can take as long as 15% of the total compilation time. For example, for each reference to a particular header file in the source files 114 that scanner 104 may encounter, scanner 104 may scan that header file and create tokens, even if the scanner 104 has encountered that particular header file previously because it was referenced in a different source file.

In an embodiment, this process may be made more efficient by storing for later use the tokens created by scanner 104. Header files 116 may be processed by scanner 104 and tokens may be created. These tokens may then be added to a database of tokens or pre-tokenized headers from header files 116. Upon a subsequent compilation, when the scanner 104 encounters a header file which is in the pre-tokenized header database, scanner 104 may load the tokens from the database instead of scanning the header file. However, the tokens may still need to be further processed in order for compilation to proceed. For example, they may need to be parsed into abstract syntax trees.

Front-end component 102 also includes a parser 106. Parser 106 may create abstract syntax trees from the tokens provided by scanner 104. After the text of source files 114 and header files 116 is tokenized, the text may need to be further organized to allow for further compilation. An abstract syntax tree is a data representation of the syntax structure of a source file or a header file. In particular, the tokens may convey a string of text, but the abstract syntax tree may convey meaning to that text. The abstract syntax tree may also allow for a number of operations to be performed on it, such as error checking and optimization.

Front-end component 102 also includes a lowering component 106. Lowering component 106 may be further configured to convert the abstract syntax tree to a low-level abstract syntax tree. This conversion may include a plurality of operations, such as optimizations, or a variety of bindings and error checks that may depend on the type of compiler and the specific programming language. Although embodiments are described herein with reference to an abstract syntax tree, one of skill in the art will recognize that a low-level abstract syntax tree may also be used.

Similarly to scanner 104, parser 106 takes a period of time to parse through the tokens and generate the abstract syntax tree. More particularly, in the case of header files 116, parser 106 has to create abstract syntax trees for each of the header files 116 that is referenced in a source file, even if that header file has been previously encountered by parser 106. This duplicative effort may take a significant period of time depending on the number of header files and length of the header files that are referenced in the source files 114.

Compiler 100 also includes a back-end component 112 responsible for converting abstract syntax trees into object files 118. Object files 118 may contain object code, a format which may be readable by a computing device. Object files may be combined together to form an executable program through the use of a linker program. A linker is a program which may combine object files together to create a single executable program or library. Back-end component 112 may generate object code through the use of abstract syntax trees, from header files 116 and source files 114.

Figure 2:
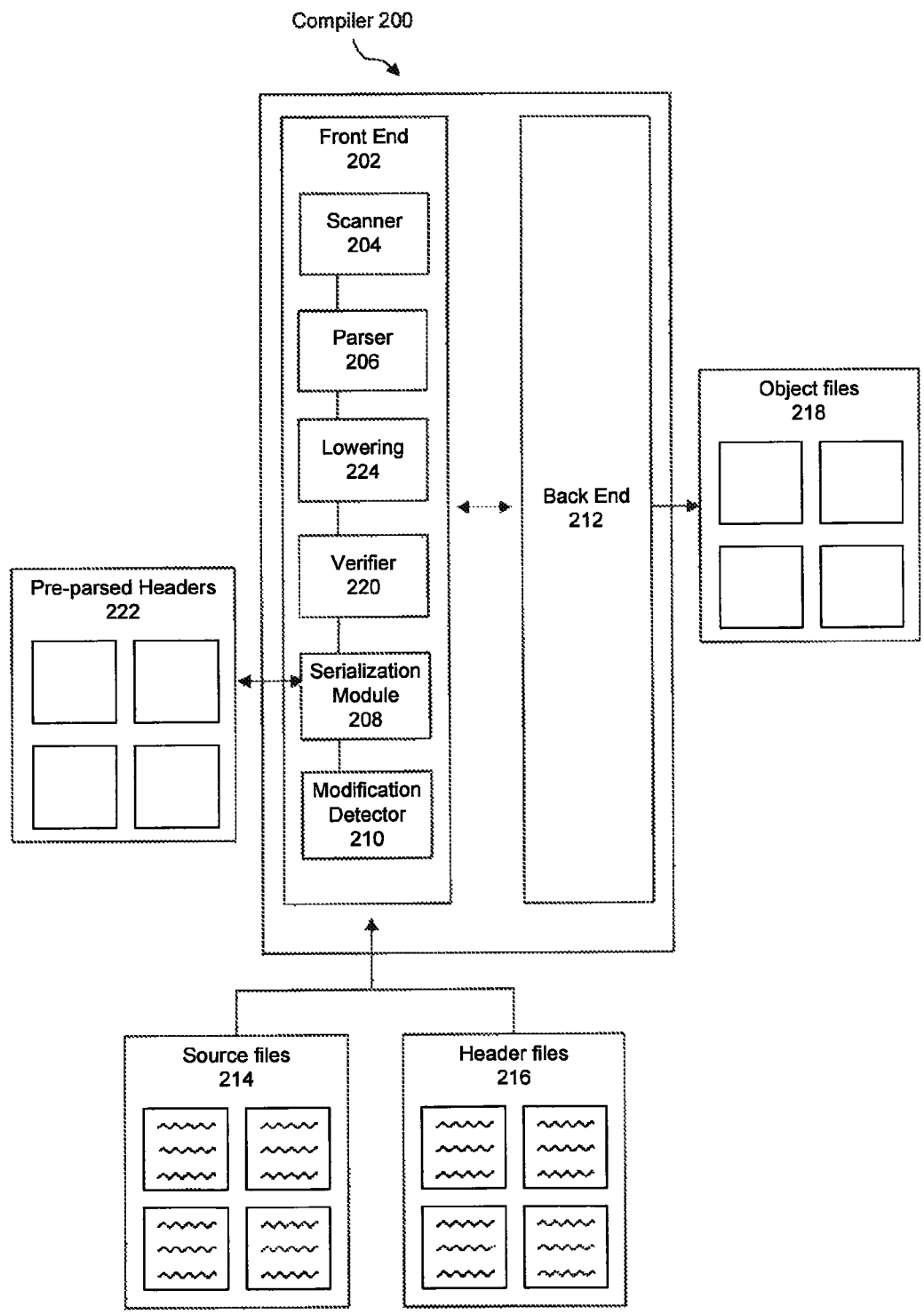
FIG. 2 is a diagram of a system of compilation using pre-parsed headers, according to an embodiment.

According to an embodiment, compiler 100 may be made more efficient. FIG. 2 is a diagram of a system of compilation using pre-parsed headers according to an embodiment. Compiler 200 includes a front-end component 202 and a back-end component 212. Front-end component 202 includes a scanner 204, parser 206, and a lowering component 224. Scanner 204 may be configured to scan source files 214 and header files 216 and create a tokenized form. Parser 206 may be configured to parse the tokenized form and create abstract syntax trees and lowering component 224 may be configured to convert abstract syntax trees into low-level abstract syntax trees.

According to an embodiment, front-end component 202 also includes a serialization module 208. Serialization module 208 may create pre-parsed headers 222 for use during the compilation process. The term pre-parsed headers, as used herein, refers to one or more pre-parsed headers. The pre-parsed headers 222 may be modularized, such that each of the header files 216 has a corresponding pre-parsed header file. Pre-parsed headers 222 may then be loaded on a subsequent compilation such that scanner 204, parser 206, and lowering component 224 do not have to process each of the corresponding header files 216 again. Moreover, if any particular header file is modified, only the corresponding pre-parsed header file or any header file that includes the modified header file may need to be updated, instead of all of the pre-parsed headers. In some cases, a plurality of header files may be grouped together into a single pre-parsed header. For example, certain header files may provide declarations which are inter-related, such that a plurality of header files are often referenced together in a particular source file. In such a case, the plurality of header files may be grouped together into a single pre-parsed header. In another example, certain groups of header files may be modified more often than other groups. In such a case, the groups that are modified less often may be grouped together, while the headers that are modified more often may have individual pre-parsed header files. Regardless, compiler 200 may process both pre-parsed headers that represent a plurality of header files in combination with pre-parsed headers that represent single header files.

Serialization module 208 may create pre-parsed headers 222 by creating an image of the abstract syntax trees of header files 216 and serializing them to a storage device. The serialization may use well-known formats such as XML, or any string-based or binary format. For example, serialization module 208 may use a format which closely resembles the compiler's own representation of the abstract syntax tree to allow for more efficient loading of pre-parsed headers 222. Once the image of the abstract syntax trees has been serialized into pre-parsed headers 222, the image may be reread by serialization module 208. Serialization module 208 may then deserialize pre-parsed headers 222 into abstract syntax trees for use by front-end component 202.

Serialization module 208 may further include in pre-parsed headers 222 a serialized image of the preprocessor symbol table. Serialization module 208 may also include in pre-parsed headers 222 a serialized image of the tokens created by scanner 204. Similar to the abstract syntax trees discussed above, the serialization may use a format which closely resembles the compiler's own representation of preprocessor table, the tokens, or both. Once the images of the abstract syntax tree, preprocessor symbol table, and tokens have been serialized into pre-parsed headers 222, the images may be reread by serialization module 208. Serialization module 208 may then deserialize pre-parsed headers 222 into preprocessor symbol tables, tokens, and abstract syntax trees for use by front-end component 202.

Upon a subsequent compilation, front-end component 202 may be further configured to locate a corresponding pre-parsed header file upon a reference to a header file in a source file. Thus, the source file can still use its normal construct for referencing header files, and front-end component 102 may be configured to locate the corresponding pre-parsed header. This may allow for an existing code base to retain its code unchanged, yet still use pre-parsed headers. For example, in the C++ programming language, the construct for referencing header files may be an include directive. Depending on the type of header file desired, the construct may take the form of, for example:

include "sample.h"

In the above example, "sample.h" is a header file, and it may have a corresponding pre-parsed header file of "sample.pph." If front-end component 202 encounters a reference to a header file, it may try to locate the corresponding pre-parsed header file. Thus, in this example, if front-end component 202 encountered the include directive to "sample.h" it may try to locate "sample.pph." If front-end component 202 is successful in locating "sample.pph," serialization module 208 may deserialize "sample.pph" into an abstract syntax tree. It may also deserialize "sample.pph" into a preprocessor table, or tokens, or both. If the corresponding pre-parsed header cannot be located, then front-end component 202 may read the header file, such as "sample.h," and then may proceed to tokenize the header using scanner 202, create a preprocessor symbol table, and generate an abstract syntax tree using parser 206.

Front-end component 202 further includes a verifier 220. Verifier 220 may be configured to check the abstract syntax tree or the preprocessor symbol table for a particular property prior to creating a pre-parsed header. For example, source files 214 may rely on the particular order in which header files 216 are examined by compiler 200 in order to utilize particular declarations. This may also be referred to as the include order of the header files.

Header files may reference other header files for declarations. Many header files make reference to other header files when they require the use of declarations inside of them, and thus, may be considered independently compilable. However, some compilers or programming languages may allow for the use of these declarations without referencing the other header files. Instead they may rely on the other header files containing the declarations, being processed first by the compiler. This may be very software specific. For example, a developer may use a declaration in a certain "a.h" that is defined in "declarations.h." The developer may further know, based upon the include order, that "declarations.h" is examined by the compiler prior to "a.h." Thus, in this particular case, the developer may not need to reference "declarations.h" in "a.h." However, in another software program, based upon a different include order, "declarations.h" may be examined by the compiler after "a.h." In that case, "a.h" may have to reference "declarations.h" in order to use its declarations.

According to an embodiment, verifier 220 may be configured to check whether a header file is independently compilable by checking the declarations referenced in the header file. If the declarations are defined in that header file or in the chain of header files which are referenced by that header file, it may be considered independently compilable. If a header file is not considered independently compilable, serialization module 208 may be configured to not create a pre-parsed header for that header file.

As discussed previously, one particular type of declaration may be a function declaration. A function declaration may describe the inputs and outputs of a function. Occasionally, there may be multiple declarations for the same named function. Typically, when multiple functions with the same name are declared, they may require different inputs and outputs. This is referred to as function overloading. The act of associating one of these overloaded functions with a particular function call expression is referred to as binding. Generally, a function may be bound with other functions of the same name when they exist in the same header file, or within the chain of header files that are referenced within the same header file. However, some compilers and programming languages may allow for a function to be bound to another header file which is neither in the same header file nor in a chain of header files which are referenced within the same header file. This may occur based upon the order in which the headers files are examined by the compiler. Similarly to the declarations discussed previously, this may be dependent on the particular software being compiled based upon the include order. In an embodiment, parser 206 may freeze the bindings of functions, such that they are bound to the scope of the header file in which they are defined, or to the chain of referenced header files within that header file. Symbols may also be bound in a similar manner to functions. In an embodiment, parser 206 may also freeze the bindings of symbols, such that they are bound to the scope of the header file in which they are defined, or to the chain of referenced header files within that header file Header files may also include preprocessor symbols inside of them. Often, however, conditions may surround the preprocessor symbol definitions. For example, a condition may check to see whether a symbol, "X", is defined or whether it equals a particular value. If "X" is defined, the compiler may perform a true operation, such as a defining the symbol "TRUE". If "X" is not defined, the compiler may perform a false operation, such as defining the symbol "FALSE".

Many compilers resolve all of the preprocessor symbols in a header file regardless of whether conditions surround them. Under the previous example, the false operation may define a certain symbol "FALSE," if the symbol "X" is not defined. But, if "X" is actually defined, "FALSE" may not be relevant because the condition never gets to the false operation. However, some compilers may still process the "FALSE" symbol anyway. According to an embodiment, verifier 220 is configured to verify whether a symbol is used. If the symbol is not used, verifier 220 may remove that symbol from the set of preprocessor symbol table, such that it is not included in the pre-parsed header file and does not need to be processed.

The processing of tokens or identifiers in a header file may vary depending on the context of a compilation. For example, a header file may include the identifier "X" in its text. In one compilation, "X" may actually mean "X." However, in a different compilation, "X" may have been previously declared as a preprocessor symbol. In such a case, when the same header file is processed again, "X" may be replaced to mean "Y" or some other declaration. The preprocessor symbol may be declared because a header file references another header file, although the preprocessor symbol may also be declared because of the include order or by the compiler itself. Thus, the same header file, after being processed more than once, may have a different meaning in another context because some of its identifiers may have been replaced.

A pre-parsed header, however, may only represent the state of the preprocessor symbol table and the identifiers of its corresponding header file based upon the context in which it was created. As a result, a pre-parsed header may have conflicts with other headers or pre-parsed headers in a different context when any of its identifiers or preprocessor symbols are already declared as preprocessor symbols in another header or pre-parsed header. In an embodiment, verifier 220 may be further configured to detect these conflicts. Verifier 220 may create a list of identifiers, which are not themselves preprocessor symbols, for each of the header files 216. The lists of identifiers may then be saved in each of the pre-parsed headers 222 for use during subsequent compilations. However, not all identifiers that are in a particular header file may correspond to generated tokens in the tokenized form. This may be because of conditions on the identifiers. For example, an identifier might only be used if a particular symbol is defined or if a symbol equals a particular value. Verifier 220 may be further configured to reduce the list of identifiers by removing any particular identifiers that do not correspond to a generated token in the tokenized form.

In a subsequent compilation that uses pre-parsed headers 222, verifier 220 may be configured to load the lists of identifiers from each of the pre-parsed headers 222 and verify that each of the identifiers do not conflict with any other preprocessor symbols. Additionally, verifier 220 may also check whether any of the preprocessor symbols declared in pre-parsed headers 222 conflict with any other preprocessor symbols. For any pre-parsed header that is determined to have a conflict, verifier 220 may cause scanner 204, parser 206, and lowering component 224 to reprocess the pre-parsed header's corresponding text-based header file for use during compilation.

In some cases, for example based upon the result of verifier 220 or by choice, a pre-parsed header file may not be created for a particular header file. That header file without a corresponding pre-parsed header may be referred to as an invalidated header file. In such cases, compiler 200 may rely on the text inside of the invalidated header file for use during compilation. However, two or more headers, which have corresponding pre-parsed headers, may still reference an invalidated header file inside of them. In such cases, if the invalidated header is processed twice by the compiler in conjunction with a pre-parsed header, unexpected results may occur. In particular, several equivalent copies of the same abstract syntax tree may be created. However, there may also be other cases where equivalent copies of the same abstract syntax tree may be created. For example, an invalidated header may be referenced by multiple source files without proper limitations, preventing the invalidated header from being processed more than once. In an embodiment, serialization module 208 may be configured to determine whether two or more abstract syntax trees are equivalent. If the abstract syntax trees are equivalent, serialization module 208 may be further configured to merge each of these equivalent abstract syntax trees into a single abstract syntax tree. The single abstract syntax tree may then be used in conjunction with the pre-parsed headers for further compilation by compiler 200.

Front-end component 202 further includes a modification detector 210. However, in an embodiment, modification detector 210 may be an external process to compiler 200. The modification detector 210 may detect changes in header files 216. If changes are detected in particular header files, modification detector 210 may notify front-end component 202 not to use pre-parsed headers for the particular header files that have changed. Instead, front-end component 202 may generate new abstract syntax trees from the text of header files that have changed using parser 206 in conjunction with scanner 204. Thus, modification detector 210, serialization module 208, or scanner 204 and parser 206, may load abstract syntax trees. The abstract syntax trees may then be processed into object code.

Compiler 200 also includes a back-end component 212 responsible for converting abstract syntax trees into object files 218. The term object files, as used herein, refers to one or more object files. Object files 218 may contain object code, a format which may be readable by a computing device. Object files may be combined together to form an executable program through the use of a linker program. A linker is a program which combines object files together to create a single executable program or library.

Back-end component 212 may generate object code through the use of abstract syntax trees from header files 216 and source files 214. The abstract syntax trees from the header files 216 may have been loaded through a combination of pre-parsed headers 222 and headers created by the parser 206 in conjunction with scanner 204. Regardless, once the abstract syntax trees are loaded, the back-end component 212 may then generate the object files 218.

Figure 3A:
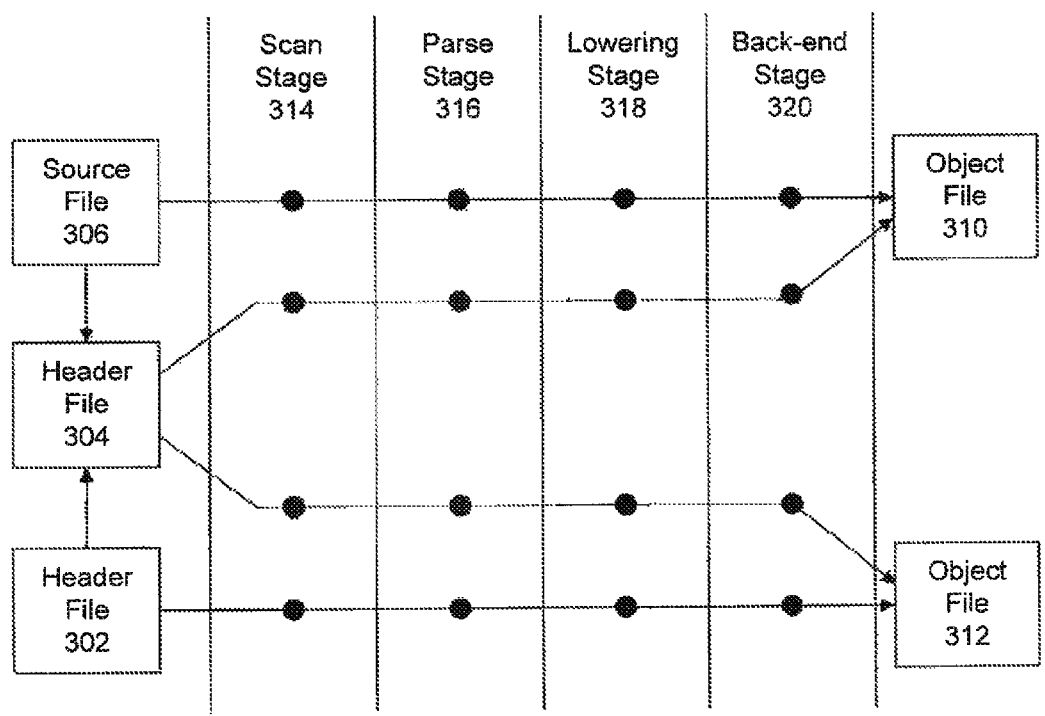
FIG. 3A is a sequence diagram of a typical compilation of two source files that reference the same header file.

FIG. 3A is a sequence diagram of a typical compilation 300 of two source files that reference the same header file. Compilation 300 includes a source file 302 and a source file 306 that both reference a header file 304. In particular, compilation 300 depicts source file 302, source file 306, and header file 304 as they may be processed by different stages of the compiler. During the compilation of object file 310, a scan stage 314 may scan source file 306 and header file 304 into a tokenized form. The scan stage 314 may also create a preprocessor symbol table. The scan stage 314 may be implemented by a scanner, for example scanner 204 of FIG. 2. A parse stage 316 may parse header file 304, and source file 306 into abstract syntax trees. The parse stage 316 may be implemented with a parser, for example parser 206, of FIG. 2. A lowering stage 318 may convert high-level abstract syntax trees into low-level abstract syntax trees using a lowering component, for example lowering component 224 of FIG. 2. A back-end stage 320 may then create object file 310 from the abstract syntax trees and tokens produced from scan stage 314 and lowering stage 318. The back-end stage may be implemented by a back-end component, for example back-end component 212 of FIG. 2. Likewise, during the compilation of object file 312, all of the aforementioned stages may process both header file 304 and source file 302. Thus, the processing of header file 304 may occur in both the compilation of object file 310 and object file 312, which may result in the use of more processing resources.

Figure 3B:
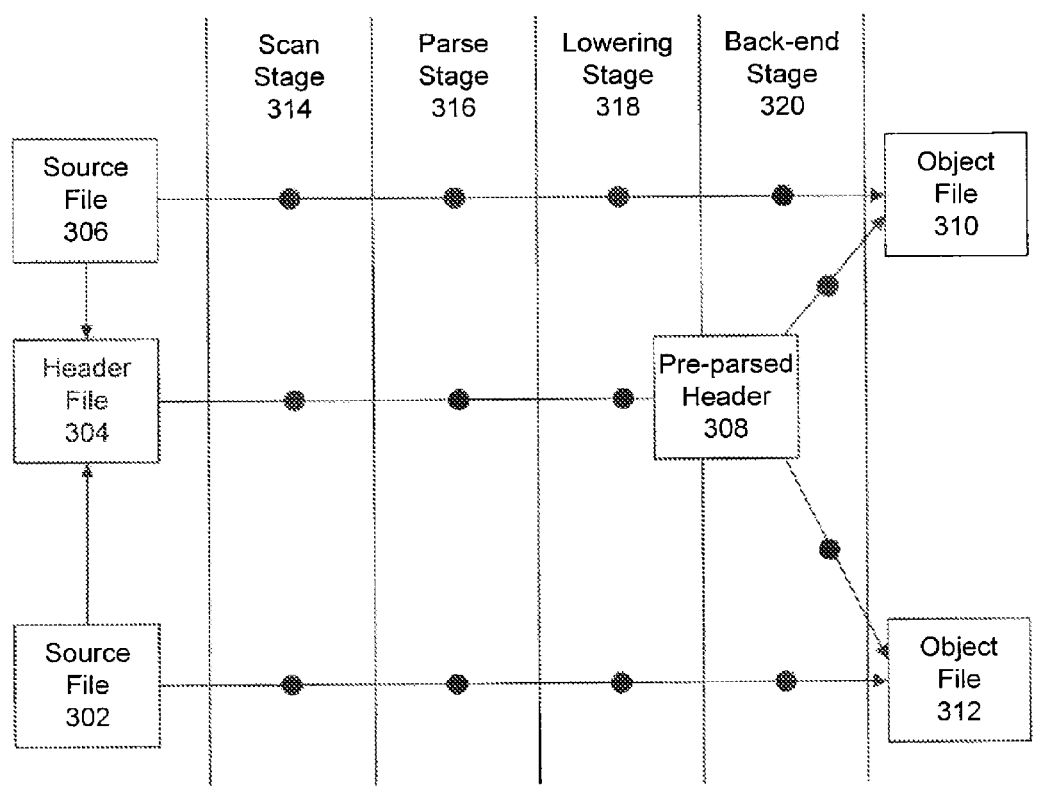
FIG. 3B is a sequence diagram of an example compilation using pre-parsed headers with two source files that reference the same header file according to an embodiment.

With the use of pre-parsed headers, as described herein, compilation may be made more efficient. FIG. 3B is a sequence diagram of an example compilation 350 using pre-parsed headers with two source files that reference the same header file, according to an embodiment. Similarly to compilation 300, compilation 350 depicts source file 302, header file 304, source file 306, object file 310, and object file 312. Furthermore, compilation 350 includes scan stage 314, parse stage 316, lowering stage 318, and generate stage 320. Similarly to compilation 300, source file 302 and source file 306 must be processed by each of the stages. However, compilation 350 also includes a pre-parsed header 308 for use during the compilation. As a result, header file 304 may need to be processed only once by scan stage 314, parse stage 316, and lowering stage 318. The back-end stage 320 may then process the contents of pre-parsed header 308 twice in order to incorporate pre-parsed header 308 into object file 310 and object file 312. This may cause compilation 350 to have a decreased total compilation time compared to compilation 300. Although pre-parsed header 308 is used in reference to compilation 350, one having skill in the art will recognize that pre-parsed header 308 may be used in any compilation that uses header file 304.

Figure 4:
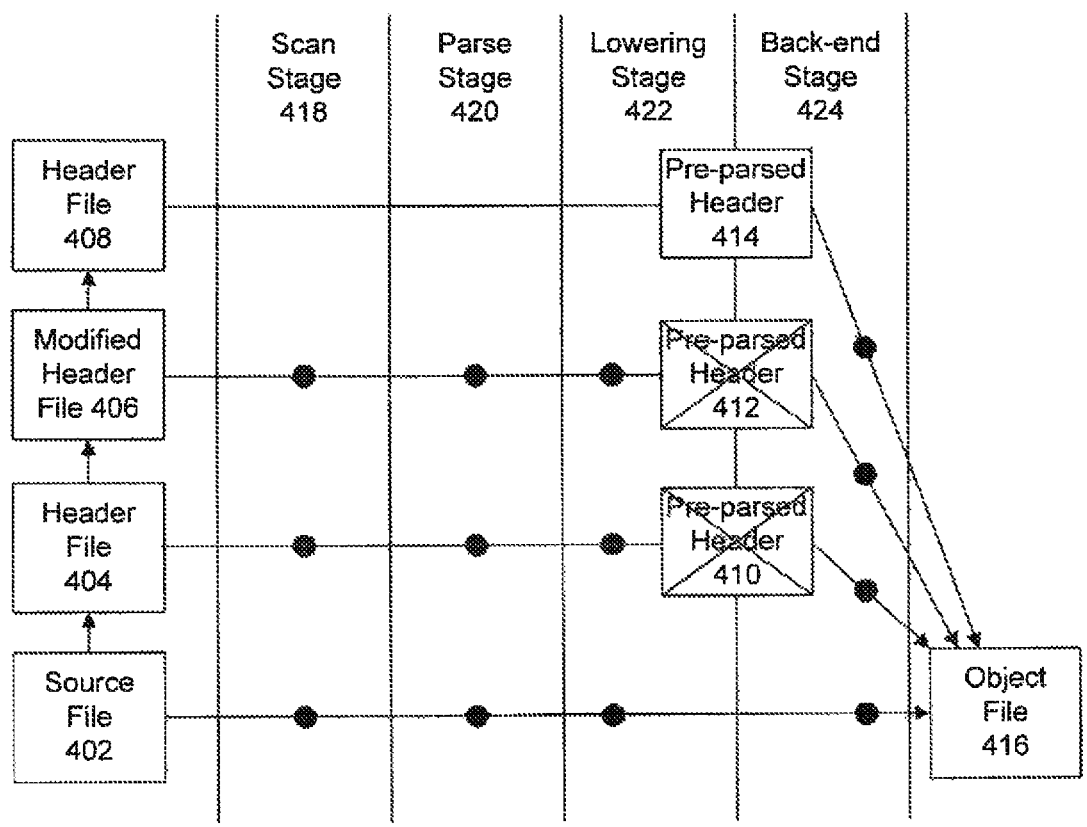
FIG. 4 is a sequence diagram of an example compilation using pre-parsed headers in a chain of header files that have been modified.

FIG. 4 is a sequence diagram of an example compilation 400 using pre-parsed headers in a chain of header files that have been modified. Compilation 400 depicts a source file 402, a header file 404, a modified header file 406, and a header file 408. Modified header file 406 may have a corresponding pre-parsed header file 412. Similarly, header file 404 may have a corresponding pre-parsed header file 410 and header file 408 may also have a corresponding pre-parsed header 414. Source file 402 may reference a header file 404 which may further reference a modified header file 406. Modified header file 406 may also reference a header file 408. Thus, header file 404 may depend from modified header file 406 and header file 408. However, modified header file 414 may have been modified since pre-parsed header file 412 was last created. In such a case, the pre-parsed header file 412 may be invalid, as pre-parsed header file 412 may not reflect the latest changes to modified header file 406.

During compilation, when a parent header file includes a child header file, the parent header file incorporates the declarations that are contained in the child header file. Thus, if any modifications occur in the child, this may affect the parent during compilation as the declarations in the child may have changed. As a result, since header file 404 may reference modified header 406, pre-parsed header 410 may also be invalid. Thus, because modified header file 406 may have been modified, both pre-parsed header 410 and pre-parsed header 412 may need to be recreated.

Compilation 400 also depicts several stages of processing when a header file may have been modified. A scan stage 418 may be configured to scan source files and header files into tokens. A parse stage 420 may be configured to parse the tokens into abstract syntax trees. A lowering stage 422 may convert the abstract syntax trees into low-level abstract syntax trees, and a back-end stage 424 may create object file 416 from the low-level abstract syntax trees and the tokens. Since pre-parsed header 410 and pre-parsed header 412 may have been invalidated, modified header file 406 and header file 404 may need to be processed by all of the stages. However, header file 408 does not depend from modified header file 406, and thus may not need to be reprocessed. Therefore, pre-parsed header file 414 may not have been invalidated and can still be used during the back-end stage 422 to create object file 416. As a result, even when a header file may have been modified, not all of the headers may need to be reprocessed by compilation 400.

Figure 5:
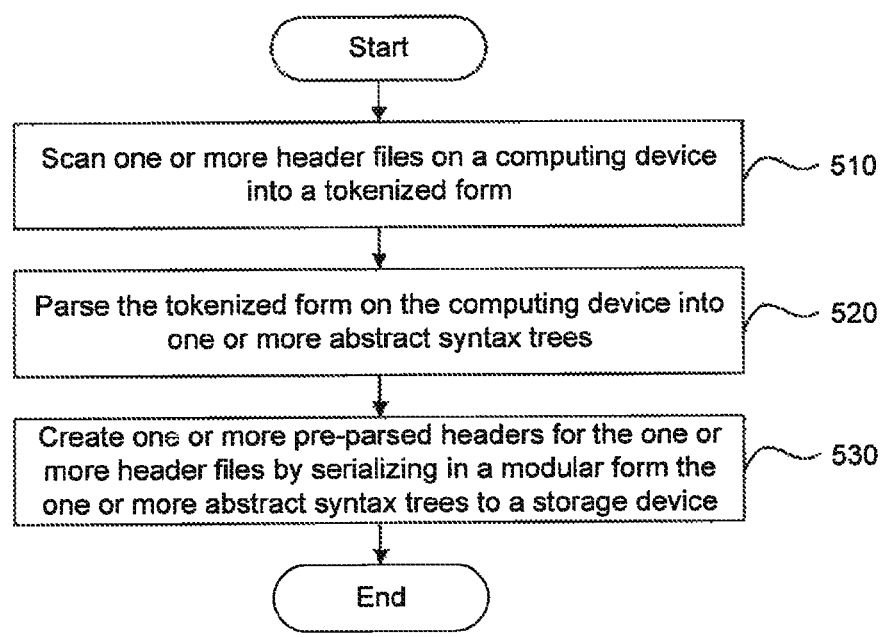
FIG. 5 is a flow diagram of a method for creating pre-parsed headers, according to an embodiment.

FIG. 5 is a flow diagram of a method 500 for creating pre-parsed headers, according to an embodiment. At block 510 of method 500, one or more header files on a computing device are scanned into a tokenized form. The tokenized form may be a series of tokens which represent the words in the text of the one or more header files. This may be done by a scanner, for example scanner 204 of FIG. 2. These tokens may then be stored on the computing device, for example in random access memory or, as discussed above, in a database. The tokens may also be used in creating a preprocessor symbol table.

At block 520, the tokenized forms on the computing device may be parsed into abstract syntax trees. Each header file may have a corresponding abstract syntax tree. This may be done by a parser, for example parser 206 of FIG. 2.

At block 530, pre-parsed headers may be created from the abstract syntax trees created at block 520. The pre-parsed headers may be created by serializing the abstract syntax trees to a storage device in a modularized form. The pre-parsed headers may also be created by serializing any combination of abstract syntax trees, preprocessor symbol tables, tokens, or other such information as may be suitable for saving from the processing of the header file. The storage device may be any type of persistent or non-persistent storage, for example, a hard disk or memory. The serialization may occur by a serialization module, for example serialization module 208 of FIG. 2. The serialization may take the form of an XML file, or any other string or binary based file. In particular, the serialization may take the form of a data representation that closely resembles a compiler's internal representation of abstract syntax trees. This may allow for faster loading of the abstract syntax trees, preprocessor symbol tables, or tokens.

Each of the pre-parsed header files may correspond to an individual header file. However, in an embodiment, a pre-parsed header file may correspond to a plurality of header files which are grouped together. Although, even if in a particular software a pre-parsed header represents a plurality of header files, there still may be further header files that are each represented by a different pre-parsed header file.

Method 500 may also further include a verification stage. The verification stage may check that each of the header files that correspond to a pre-parsed header is independently compilable. It may also freeze function bindings, symbol bindings, or both such that declarations are bound to the header in which they are defined or to the chain of headers referenced in their header. The verification stage may also create a list of identifiers for each of the header files. The identifiers may appear in the text of a header file, but are not themselves preprocessor symbols. The list of identifiers may also be further refined to exclude identifiers that are not used to generate tokens. The list of identifiers may then be serialized in a pre-parsed header file. This may be performed by a serialization module, for example, serialization module 208 of FIG. 2. Once a pre-parsed header has been created it can then be further used by a compiler for compilation.

Figure 6:
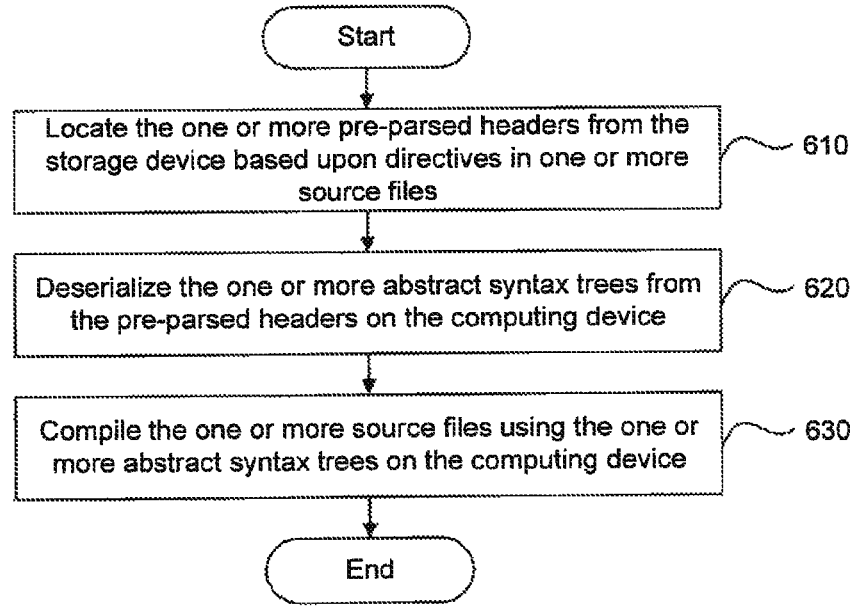
FIG. 6 is a flow diagram of a method for loading a pre-parsed header for use in compilation.

FIG. 6 is a flow diagram of a method 600 for loading a pre-parsed header for use in compilation. At block 610 of method 600, one or more pre-parsed headers are located based upon directives in one or more source files. The location may be found by a serialization module, for example, serialization module 208 of FIG. 2. A source file may reference a header file through the use of a directive such as an include directive. Based upon the reference to a header file, a pre-parsed header may be located on a computing device. This may allow a source file to use pre-parsed headers without having to modify the source file in any way. In particular, if a source file, for example, references a header file of "example.h," the pre-parsed header of "example.pph" may be located based upon that reference and then deserialized. Thus, the source file may still retain the reference to "example.h," and also alternately reference pre-parsed headers.

At block 620, one or more abstract syntax trees may be deserialized or loaded from a pre-parsed header stored on the computing device. One or more tokens, one or more preprocessor symbol tables, one or more identifier lists, or any combination thereof, may also be loaded from a pre-parsed header stored on the computing device. As discussed for method 500, the pre-parsed header may be a serialized version of abstract syntax trees. However, the pre-parsed header may also include serialized versions of the preprocessor symbol table, the identifier list, and tokens. This may be in a format such as XML, text, or binary data. Thus, the pre-parsed header may be deserialized directly into abstract syntax trees, a preprocessor symbol table, an identifier list, tokens, or any combination thereof. The abstract syntax trees, identifier list, preprocessor symbol table, and tokens may then be loaded onto a computing device. For example, the abstract syntax trees may be loaded into a compiler's internal data representation of abstract syntax trees. Similarly, the preprocessor symbol table and tokens may also be loaded into each of their respective data structures. This may then allow the compiler to compile source files using the loaded abstract syntax trees, preprocessor symbol tables, and tokens from the pre-parsed headers.

Method 600 may further include a verification stage that checks the list of identifiers and preprocessor symbol table of each pre-parsed header for consistency in the current context. For example, each of the identifiers in a list of identifiers may be checked to determine if they are also defined symbols in any other preprocessor symbol table such that in the context the identifiers may be replaced. The preprocessor symbol table may also be checked for symbols that are defined in any other preprocessor symbol table such that in the current context the symbols may be replaced. The verification stage may be performed by a verifier, for example, verifier 220 of FIG. 2. If it is determined that a conflict exists for a particular pre-parsed header, the corresponding textual header file may be used during compilation instead of the pre-parsed header.

In method 600 the situation when two or more pre-parsed header files reference a shared header file that does not have a corresponding pre-parsed header may also be detected. In such a case, the shared header file may be processed twice during compilation, such that two or more abstract syntax trees may be created. If it is detected that such a case occurs, the abstract syntax trees may be merged together to form a single abstract syntax tree for use during compilation.

At block 630, one or more source files are compiled using the one or more abstract syntax trees on the computing device. The compilation may also include the use of preprocessor symbol tables, tokens, or both. The compilation may use a combination of pre-parsed headers and header files based upon the needs of the software. For example, if a particular header file is frequently being modified, a developer may decide not to use a pre-parsed header file or if a pre-parsed header file cannot be located, the compiler may use a header file instead of a pre-parsed header file. The compilation may be performed by, for example, compiler 200 of FIG. 2.

Figure 7:
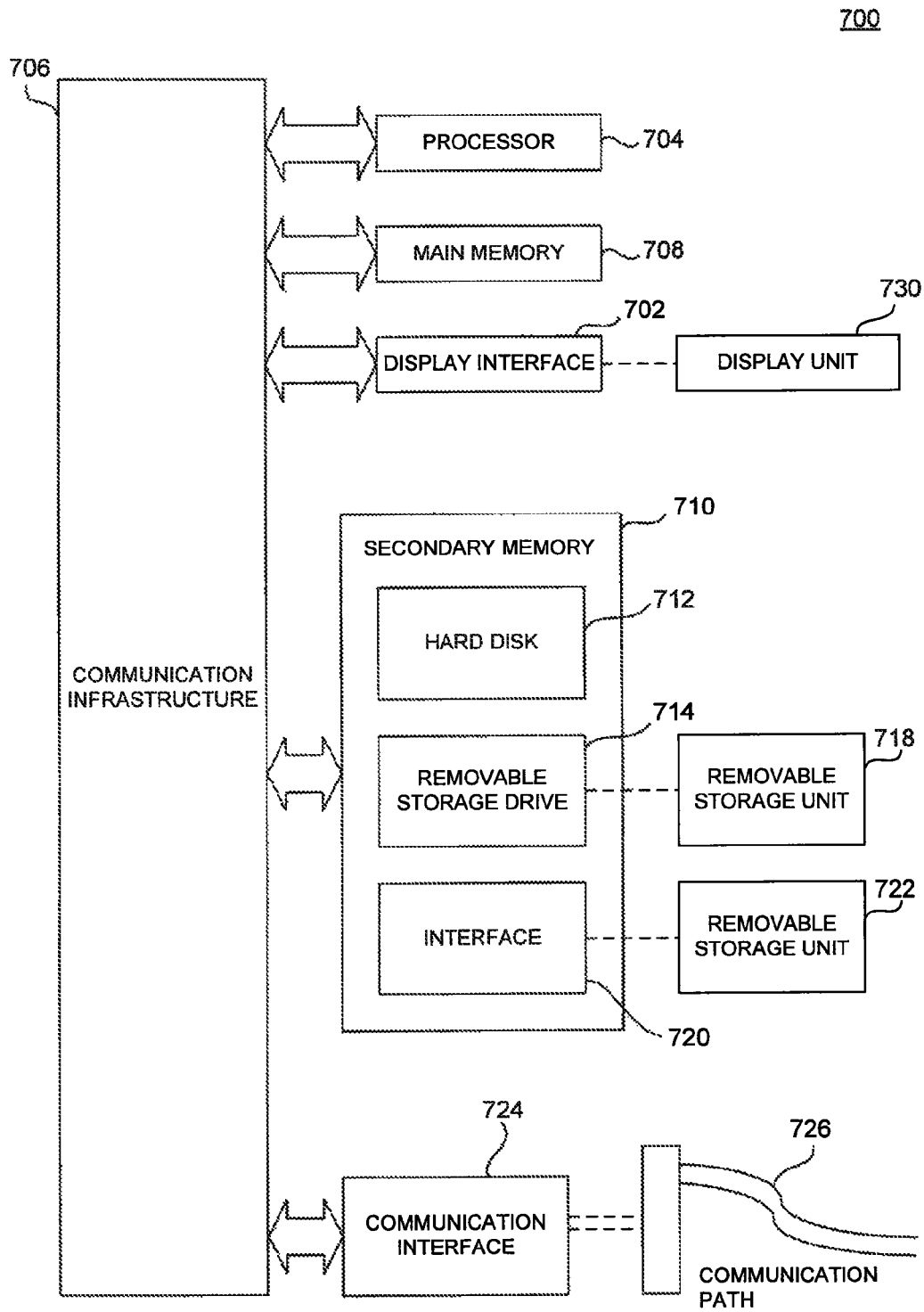
FIG. 7 illustrates an example computer system in which embodiments as described above, or portions thereof, may be implemented.

FIG. 7 illustrates an example computer system 700 in which embodiments as described above, or portions thereof, may be implemented. For example, compiler 200, including portions thereof, may be implemented in computer system 700 using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-6.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 700. After reading this description, it will become apparent, to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712 and removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, etc. which is read by and written to by removable storage drive 714. As will be appreciated by persons skilled in the relevant art, removable storage unit 718 includes a computer readable storage medium having stored thereon computer software and/or data.

Computer system 700 (optionally) includes a display interface 702 (which can include input and output devices such as keyboards, mice, etc.) that forwards graphics, text, and other data from communication infrastructure 706 (or from a frame buffer not shown) for display on display unit 730.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in the form of signals, which may be electronic, electromagnetic, optical, or other signals capable of being received by communications interface 724. These signals may be provided to communications interface 724 via a communications path 726. Communications path 726 carries signals and may be implemented using wire or cable, fiber optics, a phone line, a cellular phone link, an RF link or other communications channels.

Some embodiments may be directed to computer products comprising software stored on any computer readable storage medium. Such software, when executed in one or more data processing device, causes a data processing device(s) to operate as described herein.

Certain embodiments may be implemented in hardware, software, firmware, or a combination thereof. Some embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A method for pre-parsing headers comprising:
   scanning one or more header files on a computing device into a tokenized form and scanning the tokenized form for one or more symbols and creating one or more pre-processor symbol tables based upon the one or more symbols;
   parsing the tokenized form on the computing device into one or more abstract syntax trees;
   creating one or more pre-parsed headers for the one or more header files, by:
      serializing in a modular form the one or more abstract syntax trees to a storage device;
      serializing in a modular form the tokenized form to the storage device; and
      serializing in a modular form the one or more preprocessor symbol tables to the storage device;
   locating the one or more pre-parsed headers from the storage device based upon directives in one or more source files;
   deserializing the one or more abstract syntax trees from the pre-parsed headers on the computing device; and
   compiling the one or more source files using the one or more abstract syntax trees on the computing device.

2. The method of claim 1, wherein the locating the one or more pre-parsed headers comprises:
   receiving one or more directives in a source file, wherein the directives specify one or more header files; and
   locating, based upon the one or more directives in the source file, one or more corresponding serialized pre-parsed headers on the storage device.

3. The method of claim 2, wherein the directives comprise include directives.

4. The method of claim 1, wherein the one or more header files are independently compilable.

5. The method of claim 1, further comprising freezing a symbol binding in the one or more header files.

6. The method of claim 1, further comprising:
   detecting a change in the one or more header files on the computing device;
   generating one or more new abstract syntax trees on the computing device for each of the one or more header files that has changed; and
   creating one or more new pre-parsed headers for each of the one or more header files that have changed, by serializing in a modular form, the one or more new abstract syntax trees to a storage device.

7. The method of claim 6, further comprising:
   locating the new pre-parsed headers for each of the one or more header files that has changed from the storage device;
   deserializing the new abstract syntax tree from the new pre-parsed headers on the computing device for each of the one or more header files that has changed; and
   compiling a source file using the new abstract syntax tree from each of the one or more header files that have changed on the computing device.

8. The method of claim 1, wherein serializing the one or more abstract syntax trees to a storage device in a modular form for the one or more header files comprises creating a serialized file for each of the one or more abstract syntax trees.

9. The method of claim 1, further comprising grouping a plurality of headers into a module, wherein the plurality of headers are contained in a single serialized file.

10. The method of claim 1, further comprising:
    locating the one or more pre-parsed headers from the storage device based upon directives in one or more source files;
    deserializing the one or more abstract syntax trees from the pre-parsed headers on the computing device;

deserializing the tokenized form from the pre-parsed headers on the computing device;

deserializing the one or more preprocessor symbol tables from the pre-parsed headers on the computing device; and compiling the one or more source files using the one or more abstract syntax trees, the one or more preprocessor symbol tables, and the tokenized form on the computing device.

11. The method of claim 1, wherein:

the scanning one or more header files on a computing device into a tokenized form further comprises:

creating one or more lists of identifiers from the one or more header files, and removing each identifier in the one or more lists of identifiers based upon whether the respective identifier exists in the tokenized form; and the creating one or more pre-parsed headers for the one or more header files further comprises serializing in a modular form the one or more lists of identifiers to a storage device.

12. The method of claim 11, further comprising verifying that the one or more lists of identifiers are consistent with one or more preprocessor symbol tables.

13. The method of claim 1, further comprising:

detecting whether two or more abstract syntax trees are equivalent; and merging the two or more abstract syntax trees into a single abstract syntax tree based upon whether the two or more abstract syntax trees are equivalent.

14. A system of compilation comprising:

a non-transitory storage device;

a front-end component comprising:

a scanner configured to scan one or more header files on a computing device into a tokenized form and to scan the tokenized form for one or more symbols and create one or more preprocessor symbol tables based upon the one or more symbols;

a parser configured to parse the tokenized form on the computing device into one or more abstract syntax tree; and a serialization module configured to:

create pre-parsed headers on the non-transitory storage device for the one or more header files by:

serializing in a modular form the one or more abstract syntax trees to the storage device;

serializing in a modular form the tokenized form to the storage device; and serializing in a modular form the one or more preprocessor symbol tables to the storage device;

locate the pre-parsed headers from the storage device based upon directives in one or more source files; and deserialize the one or more abstract syntax trees from the pre-parsed headers on the computing device; and a back-end component configured to convert one or more source files into object code using the one or more abstract syntax trees loaded from the pre-parsed headers.

15. The system of claim 14, wherein the serialization module is further configured to:

receive one or more existing directives in a source file, wherein the directives specify one or more header files; and locate, based upon the one or more existing directives in the source file, one or more corresponding serialized pre-parsed headers on the storage device.

16. The system of claim 15, wherein the directives comprise include directives.

17. The system of claim 14, wherein the front-end component further comprises a verifier configured to determine whether the one or more header files are independently compilable.

18. The system of claim 14, wherein the front-end component further comprises a verifier configured to freeze a symbol binding in the one or more header files.

19. The system of claim 14, wherein the front-end component further comprises a modification detector configured to:

detect a change in the one or more header files on the computing device;

generate one or more new abstract syntax trees on the computing device for each of the one or more header files that has changed; and create one or more new pre-parsed headers for each of the one or more header files that have changed, by serializing in a modular form, the one or more new abstract syntax trees to a storage device.

20. The system of claim 14, wherein the serialization module creates a pre-parsed header for each of the one or more abstract syntax trees.

21. The system of claim 14, wherein:

the serialization module is further configured to:

locate the pre-parsed headers from the storage device based upon directives in one or more source files, deserialize the one or more abstract syntax trees from the pre-parsed headers on the computing device, deserialize the tokenized form from the pre-parsed headers on the computing device, and deserialize the one or more preprocessor symbol tables from the pre-parsed headers on the computing device; and the back-end component is further configured to convert one or more source files into object code using the one or more abstract syntax trees, the one or more preprocessor symbol tables, and the tokenized form from the pre-parsed headers.

22. The system of claim 14, further comprising a verifier configured to:

create one or more lists of identifiers from the one or more header files; and remove each identifier in the one or more lists of identifiers based upon whether the respective identifier exists in the tokenized form.

23. The system of claim 22, wherein the serializer is further configured to serialize in a modular form the one or more lists of identifiers to a storage device.

24. The system of claim 22, wherein the verifier is further configured to verify that the one or more lists of identifiers are consistent with one or more preprocessor symbol tables.

25. The system of claim 14, the serialization module is further configured to:

detect whether two or more abstract syntax trees are equivalent; and merge the two or more abstract syntax trees into a single abstract syntax tree based upon whether the two or more abstract syntax trees are equivalent.

26. A non-transitory computer readable storage medium having code stored thereon that, when executed by one or more processors, causes the one or more processors to perform operations comprising:

scanning one or more header files on a computing device into a tokenized form and scanning the tokenized form for one or more symbols and creating one or more preprocessor symbol tables based upon the one or more symbols;

parsing the tokenized form on the computing device into one or more abstract syntax trees;

creating one or more pre-parsed headers for the one or more header files, by:
 serializing in a modular form, the one or more abstract syntax trees to a storage device;
 serializing in a modular form the tokenized form to the storage device; and
 serializing in a modular form the one or more preprocessor symbol tables to the storage device;

locating the one or more pre-parsed headers from the storage device based upon directives in one or more source files;

deserializing the one or more abstract syntax trees from the pre-parsed headers on the computing device; and compiling the one or more source files using the one or more abstract syntax trees on the computing device.

27. The non-transitory computer readable storage medium of claim 26, wherein locating the one or more pre-parsed headers comprises:
 receiving one or more existing directives in a source file, wherein the directives specify one or more header files; and
 locating, based upon the one or more existing directives in the source file, one or more corresponding serialized pre-parsed headers on the storage device.

28. The non-transitory computer readable storage medium of claim 27, wherein the directives comprise include directives.

29. The non-transitory computer readable storage medium of claim 26, wherein the one or more header files are independently compilable.

30. The non-transitory computer readable storage medium of claim 26, wherein the operations further comprise freezing a symbol binding in the one or more header files.

31. The non-transitory computer readable storage medium of claim 26, wherein the operations further comprise:
 detecting a change in the one or more header files on the computing device;
 generating one or more new abstract syntax trees on the computing device for each of the one or more header files that has changed; and
 creating one or more new pre-parsed headers for each of the one or more header files that have changed, by serializing in a modular form, the one or more new abstract syntax trees to a storage device.

32. The non-transitory computer readable storage medium of claim 26, wherein the operations further comprise:
 locating the new pre-parsed headers for each of the one or more header files that has changed from the storage device;
 deserializing the new abstract syntax tree from the new pre-parsed headers on the computing device for each of the one or more header files that has changed; and
 compiling a source file using the new abstract syntax tree from each of the one or more header files that have changed on the computing device.

33. The non-transitory computer readable storage medium of claim 26, wherein the serializing the one or more abstract syntax trees to a storage device in a modular form for the one or more header files comprises creating a serialized file for each of the one or more abstract syntax trees.

34. The non-transitory computer readable storage medium of claim 26, wherein the operations further comprise grouping a plurality of headers into a module, wherein the plurality of headers are contained in a single serialized file.

35. The non-transitory computer readable storage medium of claim 26, wherein the operations further comprise:
 locating the one or more pre-parsed headers from the storage device based upon directives in one or more source files;
 deserializing the one or more abstract syntax trees from the pre-parsed headers on the computing device;
 deserializing the tokenized form from the pre-parsed headers on the computing device;
 deserializing the one or more preprocessor symbol tables from the pre-parsed headers on the computing device; and
 compiling the one or more source files using the one or more abstract syntax trees, the one or more preprocessor symbol tables, and the tokenized form on the computing device.

36. The non-transitory computer readable storage medium of claim 26, wherein:
 the scanning one or more header files on a computing device into a tokenized form further comprises:
  creating one or more lists of identifiers from the one or more header files, and
  removing each identifier in the one or more lists of identifiers based upon whether the respective identifier exists in the tokenized form; and
 the creating one or more pre-parsed headers for the one or more header files further comprises serializing in a modular form the one or more lists of identifiers to a storage device.

37. The non-transitory computer readable storage medium of claim 36, wherein the operations further comprise verifying that the one or more lists of identifiers are consistent with one or more preprocessor symbol tables.

38. The non-transitory computer readable storage medium of claim 26, wherein the operations further comprise:
 detecting whether two or more abstract syntax trees are equivalent; and
 merging the two or more abstract syntax trees into a single abstract syntax tree based upon whether the two or more abstract syntax trees are equivalent.

* * * * *